United States Patent
Ahmadi et al.

(10) Patent No.: US 10,684,441 B2
(45) Date of Patent: Jun. 16, 2020

(54) OPTIMIZATION OF HEATER SHAPE FOR INTEGRATED HEATER FOR OPTICAL BENCHES

(71) Applicant: Lumentum Operations LLC, Milpitas, CA (US)

(72) Inventors: Roozbeh Ahmadi, Ottawa (CA); Doug Cross, Ottawa (CA); Nenad Duricic, Ottawa (CA); Martin Matthews, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 437 days.

(21) Appl. No.: 15/717,513

(22) Filed: Sep. 27, 2017

(65) Prior Publication Data
US 2019/0094481 A1    Mar. 28, 2019

(51) Int. Cl.
G06G 7/48 (2006.01)
G02B 7/00 (2006.01)
F28F 27/00 (2006.01)

(52) U.S. Cl.
CPC .............. *G02B 7/008* (2013.01); *F28F 27/00* (2013.01); *F28F 2200/00* (2013.01)

(58) Field of Classification Search
CPC .................................................. G02B 7/008

USPC .............................................................. 703/6
See application file for complete search history.

(56) References Cited

PUBLICATIONS

Chen et al. :Compact bandwidth-tunable micro ring resonators vol. 32, No. 22 / Optics Letters; pp. 3361-3363. (Year: 2007).*
Lumentum, "TrueFlex Reconfigurable Optical Add-Drop Multiplexer (ROADM) Portfolio," https://www.lumentum.com/sites/default/files/technical-library-files/trueflexroadm-pb-oc-ae.pdf, Feb. 20, 2014, 4 pages.

* cited by examiner

*Primary Examiner* — Hugh M Jones
(74) *Attorney, Agent, or Firm* — Harrity & Harrity, LLP

(57) ABSTRACT

A method may include identifying, by a device, a set of components of an optical device. The method may include determining, by the device, a set of design criteria based on the set of components of the optical device. The method may include identifying, by the device, an initial heater configuration based on the set of design criteria. The method may include determining, by the device, a set of optimization parameters for determining a target heater configuration based on the set of design criteria. The method may include performing, by the device and based on the set of optimization parameters, an optimization procedure to alter the initial heater configuration to determine the target heater configuration. The method may include providing, by the device, information identifying the target heater configuration based on performing the optimization procedure.

20 Claims, 13 Drawing Sheets

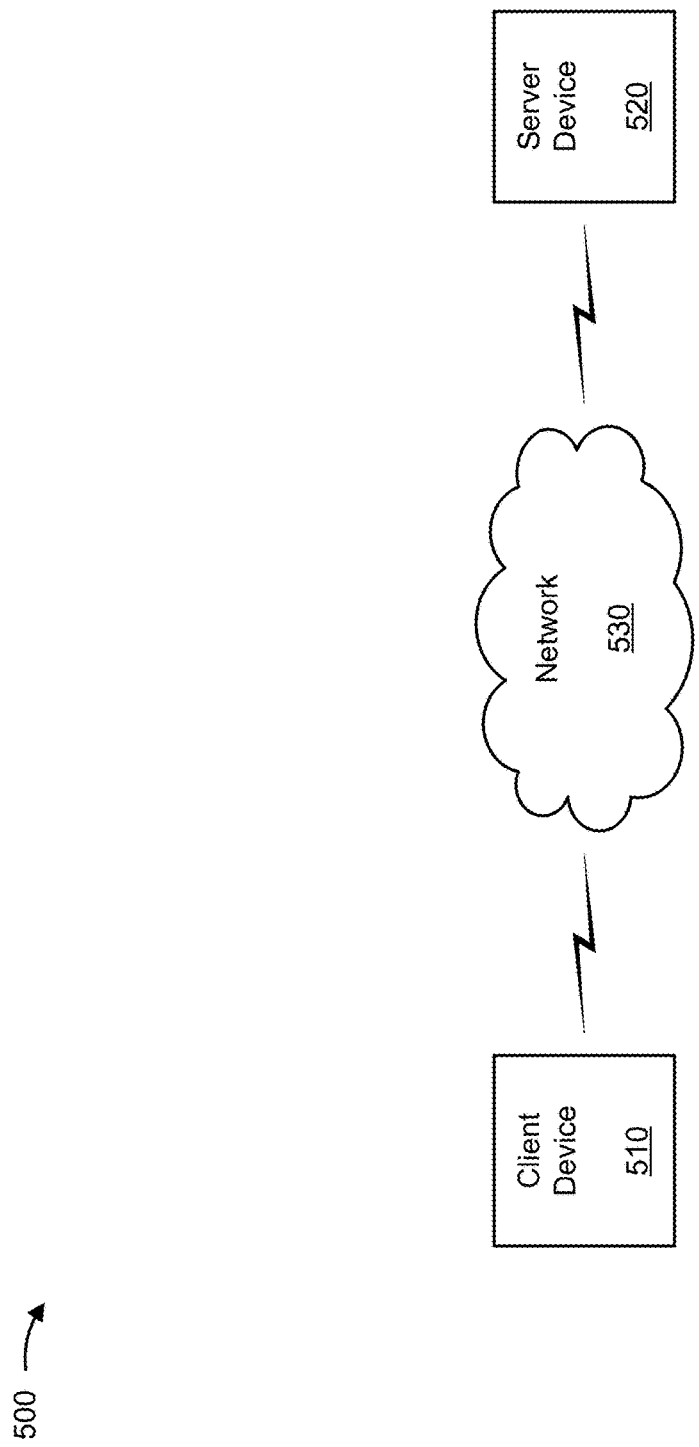

OPTIMIZATION OF HEATER SHAPE FOR INTEGRATED HEATER FOR OPTICAL BENCHES

TECHNICAL FIELD

The present disclosure relates to optical communications systems. More particularly, the present disclosure relates to an integrated heater for an optical bench and a method for optimizing the shape of the integrated heater to ensure that a heat gradient threshold is satisfied for the integrated heater and the optical bench.

BACKGROUND

For an opto-mechanical device, such as a wavelength selective switch (WSS), an isothermal environment may be provided to ensure that optical components and/or mechanical components of the opto-mechanical device provide expected performance. For example, an opto-mechanical device may be inserted into an isothermal heating device, such as an oven, to ensure an isothermal environment for the opto-mechanical device regardless of an ambient temperature of a location at which the opto-mechanical device is being operated. However, configuring a thermally conductive enclosure to maintain the isothermal environment for the opto-mechanical device may result in a size criterion or a cost criterion not being satisfied for the opto-mechanical device. Accordingly, it would be advantageous to configure an isothermal environment for an opto-mechanical device without requiring a thermally conductive enclosure.

A heater may be integrated into an optical bench to provide heating for other components included in the optical bench. For example, the heater may provide heat output to maintain an isothermal environment of approximately 60 degrees Celsius (° C.) at an ambient temperature range of between −5° C. and 60° C. As the ambient temperature shifts toward the lower end of the temperature range, the heater may output a greater amount of power to maintain an operating temperature of the components, which may result in an excessive cost and/or increase a likelihood of failure of the heater and/or of components exposed to the heater. Heater designs may cause temperature gradients in the optical bench. For example, a first portion of the optical bench may experience a first temperature and a second portion of the optical bench may experience a second temperature that differs from the first temperature by a threshold amount, which may result in an isothermal environment not being maintained for each component of the optical bench for the ambient temperature range.

SUMMARY

According to some possible implementations, a method may include identifying, by a device, a set of components of an optical device. The method may include determining, by the device, a set of design criteria based on the set of components of the optical device. The method may include identifying, by the device, an initial heater configuration based on the set of design criteria. The method may include determining, by the device, a set of optimization parameters for determining a target heater configuration based on the set of design criteria. The method may include performing, by the device and based on the set of optimization parameters, an optimization procedure to alter the initial heater configuration to determine the target heater configuration. Performing the optimization procedure may include determining a thermal computational fluid dynamics model for the optical device, calculating a set of coefficients for external surfaces of a package for the optical device, determining a boundary condition in a finite element analysis model, determining a model of conductive air inside an optics block of the optical device, executing the finite element analysis model to optimize an unknown subset of a set of geometric variables, and cross-correlating results of executing the finite element analysis model with the thermal computational fluid dynamics model to determine whether the set of design criteria is satisfied. The method may include providing, by the device, information identifying the target heater configuration based on performing the optimization procedure.

According to some possible implementations, a method may include identifying, by a device, a set of components of an optical device. The method may include determining, by the device, a set of design criteria based on the set of components of the optical device. The method may include identifying, by the device, an initial heater configuration based on the set of design criteria. The method may include determining, by the device, a set of optimization parameters for determining a target heater configuration based on the set of design criteria. The method may include performing, by the device and based on the set of optimization parameters, an optimization procedure to alter the initial heater configuration to determine the target heater configuration. The method may include providing, by the device, information identifying the target heater configuration based on performing the optimization procedure.

According to some possible implementations, a method may include identifying, by a device, a set of components of an optical device. The method may include determining, by the device, a set of design criteria based on the set of components of the optical device. The method may include identifying, by the device, an initial heater configuration based on the set of design criteria. The method may include determining, by the device, a set of optimization parameters for determining a target heater configuration based on the set of design criteria. The method may include performing, by the device and based on the set of optimization parameters, an optimization procedure to alter the initial heater configuration to determine the target heater configuration. The target heater configuration may include a plurality of heating elements disposed onto an interior surface of an optical package without an adhesive layer being disposed between the plurality of heating elements and the interior surface of the optical package. The optical package may be to enclose the optical device. The plurality of heating elements may be arranged in a shape to provide an isothermal environment inside the optical package. The isothermal environment may include a temperature gradient of less than 3 degrees Celsius. The method may include providing, by the device, information identifying the target heater configuration based on performing the optimization procedure.

BRIEF DESCRIPTION OF THE DRAWINGS

FIG. 5 is a diagram of an example environment in which systems and/or methods, described herein, may be implemented.

DETAILED DESCRIPTION

The following detailed description of example implementations refers to the accompanying drawings. The same reference numbers in different drawings may identify the same or similar elements.

An opto-mechanical device may be operated in an isothermal environment to ensure consistent performance. For example, the opto-mechanical device may be packaged into a thermally conductive enclosure, and the thermally conductive enclosure may be situated in an isothermal environment, such as an oven. Additionally, or alternatively, a heater may be attached to the outside of the thermally conductive enclosure to cause heat to be distributed by the thermally conductive enclosure onto components of the opto-mechanical device. However, utilization of a thermally conductive enclosure may result in greater than a threshold size for the opto-mechanical device and/or greater than a threshold cost associated with the opto-mechanical device. Moreover, utilization of a heater external to the thermally conductive enclosure may result in greater than a threshold utilization of power resources. Furthermore, utilization of an integrated heater, rather than a heater external to the thermally conductive enclosure may result in a threshold temperature gradient for components of the opto-mechanical device, thereby reducing a likelihood of consistent performance, reducing a lifespan of components of the opto-mechanical device, or the like. Accordingly, it would be advantageous to configure an isothermal environment for an opto-mechanical device with less than a threshold temperature gradient and with less than a threshold power requirement.

Some implementations, described herein, may provide for configuring an optimized shape for an integrated heater for an opto-mechanical device. For example, some implementations described herein may include a method for optimizing the shape for the integrated heater using a multi-stage design optimization procedure. In this way, a level of optimization for the shape may be improved. In other words, a heater configuration determined based on performing the multi-stage design optimization procedure may be associated with a reduced temperature gradient, a reduced power consumption, or the like relative to a heater design obtained using another design procedure. Moreover, some implementations described herein may include an optimized heater design, obtained using the multi-stage design optimization procedure, for use for an opto-mechanical device, such as a wavelength selective switch (WSS). In this way, an integrated heater manufactured based on the optimized heater design may provide heating for an opto-mechanical device with a non-thermally conductive enclosure with a reduced temperature gradient and/or a reduced power consumption relative to another design for a heater.

Figure 1A:
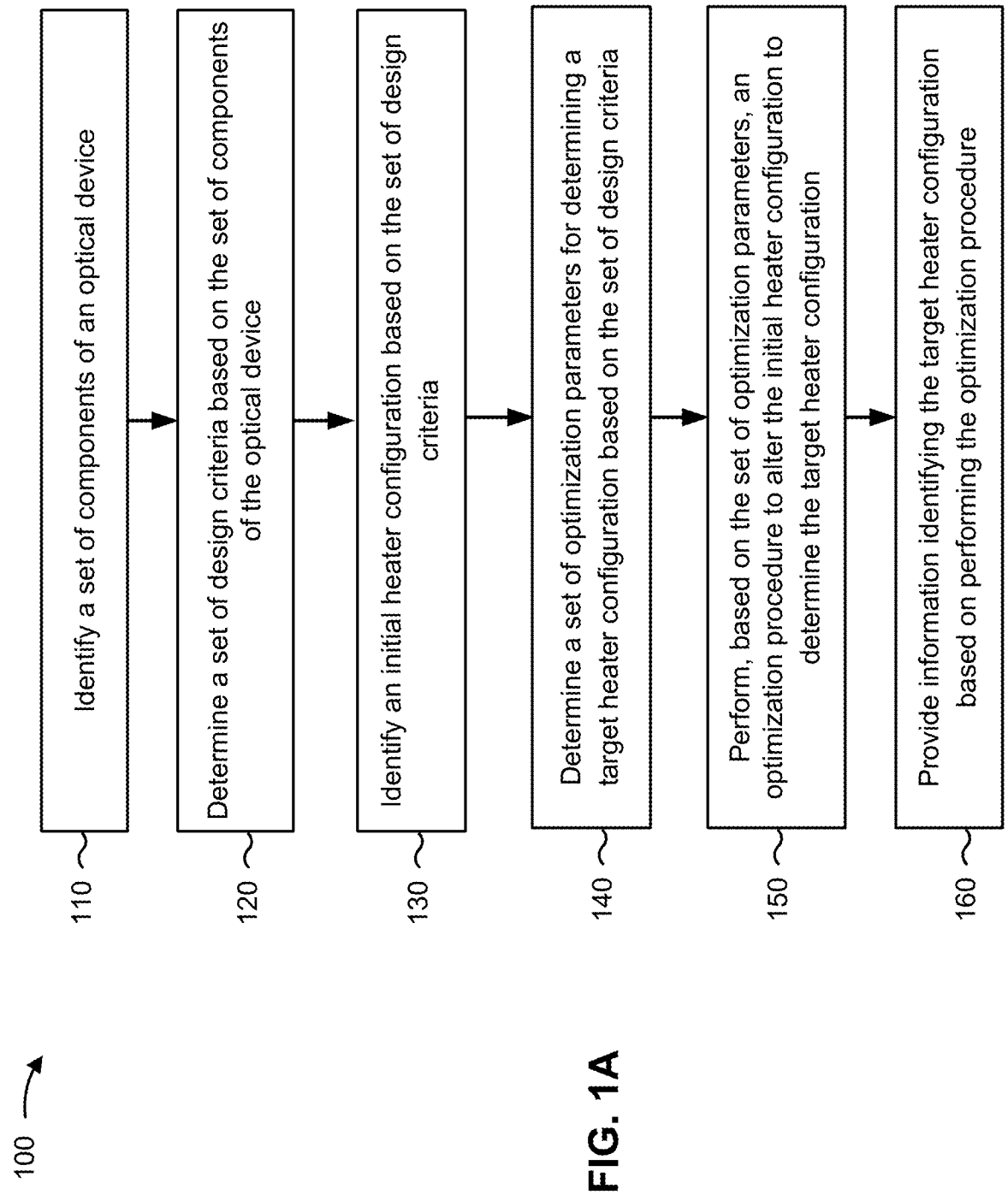
FIGS. 1A and 1B are flow charts of an example process for optimizing a heater shape of an integrated heater for an optical bench.
Figure 1B:
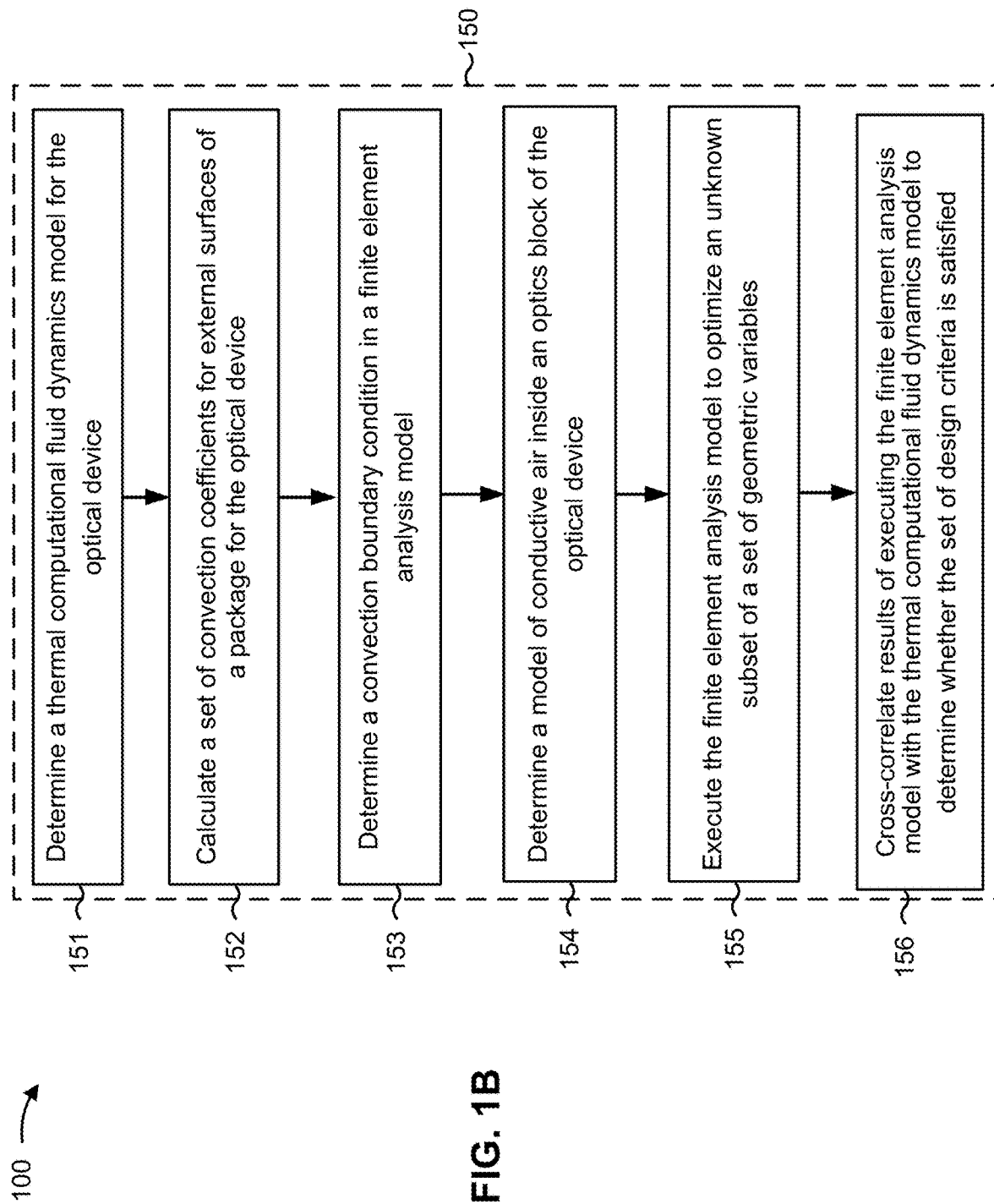

FIGS. 1A and 1B are flow charts of an example process 100 for optimizing a heater shape of an integrated heater for an optical bench. In some implementations, one or more process blocks of FIGS. 1A and 1B may be performed by client device 510, as described herein with regard to FIG. 5. In some implementations, one or more process blocks of FIGS. 1A and 1B may be performed by another device or a group of devices separate from or including client device 510, such as server device 520.

FIGS. 1A and 1B are described with regard to FIGS. 2A-2E. FIGS. 2A-2E are diagrams of an example implementation 200 relating to example process 100 shown in FIGS. 1A and 1B. FIGS. 2A-2E show an example of optimizing a heater shape of an integrated heater for an optical bench.

As shown in FIG. 1A, process 100 may include identifying a set of components of an optical device (block 110). For example, client device 510 may identify the set of components of the optical device. In some implementations, client device 510 may receive input identifying the set of components of the optical device. For example, during design of the integrated heater, a designer may identify components that are to be included in the optical device. In some implementations, client device 510 may automatically identify the set of components. For example, client device 510 may use a natural language recognition technique to parse a requirements document, an image processing technique to parse a design specification, or the like. As shown with regard to FIG. 2A, and reference number 206, the designer may identify, in optical device 202, a set of components 204-1 through 204-8 (hereinafter referred to individually as "component 204," and collectively as "components 204"). In this case, the designer may provide input to client device 510, and client device 510 may receive the input identifying components 204.

Optical device 202 may be a particular type of optical device, in some implementations. For example, optical device 202 may be a wavelength selective switch (WSS) device, an optical bench that includes a WSS, a reconfigurable optical add-drop multiplexer (ROADM), a transmitter, a receiver, a transceiver, an amplifier, an erbium-doped fiber amplifier (EDFA), a silicon photonics chip/device, a 3D sensing device/sub-assembly, or another type of optical device or optical bench that includes another type of optical device. Component 204 may be a particular type of optical component, in some implementations. For example, component 204 may be a waveguide. Additionally, or alternatively, component 204 may be an optic (e.g., a grating, a prism, a grating-prism (grism), a lens (e.g., a spherical lens or a field flattener lens), a filter, a mirror, a fiber array unit (FAU), a switching engine (e.g., using a micro-electro-mechanical systems (MEM) technology or a liquid crystal on silicon (LCoS) technology), a silicon photonics component (e.g., a silicon photonics chip), and/or the like. Additionally, or alternatively, component 204 may be a transmitter, a receiver, an amplifier, a switch, or the like. Additionally, or alternatively component 204 may include a temperature sensor, such as a thermistor, to provide a feedback loop for the integrated heater.

In this way, client device 510 identifies the set of components of the optical device.

As further shown in FIG. 1A, process 100 may include determining a set of design criteria based on the set of components of the optical device (block 120). For example, client device 510 may determine the set of design criteria based on the set of components of the optical device. In some implementations, client device 510 may receive input identifying the set of design criteria. For example, during design of the integrated heater, a designer may identify design criteria that are to be evaluated in optimizing the integrated heater shape.

In some implementations, the set of design criteria may include a sensitivity criterion. For example, a first component may be determined to be associated with normal operation (i.e., operation within a predicted range of values, such as transmission of an optical beam within a predicted wavelength range) for a first temperature gradient and a second component may be determined to be associated with normal operation for a second temperature gradient.

In some implementations, the set of design criteria may include a location criterion. For example, a first component may be positioned at a first location in an optical package and a second component may be positioned at a second location in the optical package to form, for example, an optical path. In some implementations, one or more design criteria, of the set of design criteria, may be determined with regard to a two-dimensional position. For example, the sensitivity criterion and the location criterion for a component may be determined with regard to a horizontal (in-plane) temperature gradient and a horizontal position in the optical package, respectively. As an example, with regard to FIG. 2A, a horizontal temperature gradient and a horizontal position may be specified as design criteria with regard to the X-axis and the Y-axis. In some implementations, one or more design criteria, of the set of design criteria, may be determined with regard to a three-dimensional position. For example, the sensitivity criterion for a component or the location criterion for a component may be determined with regard to both a horizontal (in-plane) temperature gradient and a vertical (out-of-plane) temperature gradient or a horizontal position in the optical package and a vertical position in the optical package, respectively. As an example, with regard to FIG. 2A, a horizontal temperature gradient may be determined with regard to the X-axis and the Y-axis, and a vertical temperature gradient may be determined with regard to the Z-axis.

In some implementations, the set of components may be classified based on the set of design criteria. For example, one or more components, of the set of components, may be classified as critical components based on being associated with a threshold sensitivity criterion (e.g., a greatest sensitivity to temperature gradients relative to other components of the set of components). Although described herein in terms of "critical" components, other classifications of components may be possible.

In this way, client device 510 may determine the set of design criteria.

As further shown in FIG. 1A, process 100 may include identifying an initial heater configuration based on the set of design criteria (block 130). For example, client device 510 may identify the initial heater configuration for an integrated heater for an optical package based on the set of design criteria. In some implementations, client device 510 may receive input identifying the initial heater configuration. For example, during design of the integrated heater, a designer may identify the initial heater configuration based on the set of design criteria, and may provide input to client device 510 to identify the initial heater configuration.

In some implementations, an initial heater location for one or more heaters may be determined to identify the initial heater configuration. For example, based on a set of characteristics of the heaters and the set of design criteria (e.g., a maximum heat output of the heaters, an ambient temperature at which the optical device is to operate, a desired temperature at which the optical device is to operate, a set of locations of the set of components, etc.), a quantity of heaters may be selected. In some implementations, multiple heaters may be selected. For example, based on a set of maximum temperature gradients for the set of components, a first heater may be selected to be positioned above the set of components and a second heater may be selected to be positioned below the set of components, thereby reducing a vertical temperature gradient relative to a single heater being selected. As an example, with regard to FIG. 2B, in an initial configuration 208, a first heater 208-1 may be positioned above components 204 in the Z-axis, and a second heater 208-2 may be positioned below components 204 in the Z-axis.

Similarly, based on a single heater being determined to have insufficient heat output to maintain a selected temperature for the set of components, multiple heaters may be selected to ensure that the selected temperature is maintained. Similarly, based on a single heater being determined to output excessive heat for a component positioned relatively close to the single heater to ensure that a threshold temperature is maintained for another component positioned relatively far from the single heater, multiple heaters may be selected to ensure that less than a threshold amount of heat is output to maintain a threshold temperature.

In some implementations, an initial heater configuration may be determined based on a set of horizontal (in-plane) temperature gradients. For example, the initial heater configuration may be determined based on locations of components of the optical package and based on horizontal temperature gradients associated with the components. Based on determining the initial heater configuration based on horizontal temperature gradients and based on an aspect ratio of the optical package (e.g., with regard to FIG. 2B, the optical package being associated with a greater length in the X-axis and width in the Y-axis than a height in the Z-axis), subsequent optimization may be performed in a reduced quantity of steps, using reduced computing resources, or the like relative to determining the initial heater configuration based on vertical temperature gradients.

In some implementations, an initial heater configuration may be determined based on heat loss paths of the optical package. For example, a heat loss path (e.g., an in-plane heat loss path) may be calculated based on a thermal mass of the set of components, a thermal resistance of the optical package, or the like. In some implementations, the initial heater configuration may be determined based on edge loss associated with the heat loss path. For example, the initial heater configuration may be determined based on heat loss distribution within a threshold proximity of an edge of the optical package. In some implementations, the initial heater configuration may be determined based on comparing the edge loss to a set of quantized integrated heater power values. For example, based on the edge loss being in a first range of values, a first integrated heater power may be selected for the initial heater configuration to ensure a threshold temperature for the set of components and based on the edge loss being in a second range of values, a second, different integrated heater power may be selected.

In some implementations, an initial heater configuration may be determined based on a partial heat transfer determination. For example, the initial heater configuration may be determined based on a conductive heat transfer determination. In this way, a complexity of determinations for the initial heater configuration may be reduced relative to performing a determination of convective heat transfer or radiative heat transfer, thereby reducing a utilization of computing resources. In this way, utilization of computing resources for optimization of the integrated heater shape is reduced based on reducing a quantity of variables for optimization relative to performing optimization without an initial heater configuration determined based on identifying components and design criteria.

Figure 2A:
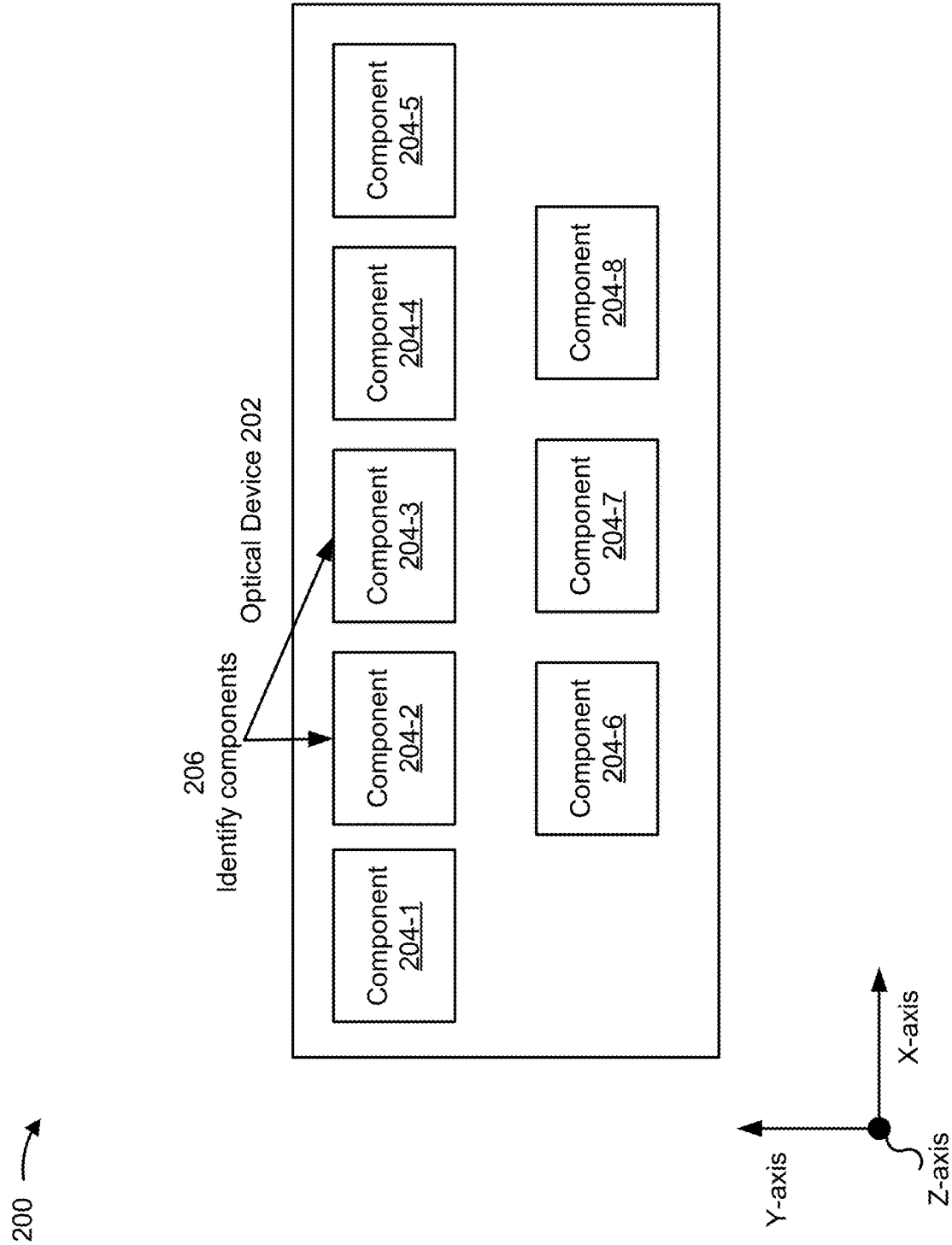
FIGS. 2A-2E are diagrams of an example implementation relating to the example process shown in FIGS. 1A and 1B.
Figure 2B:
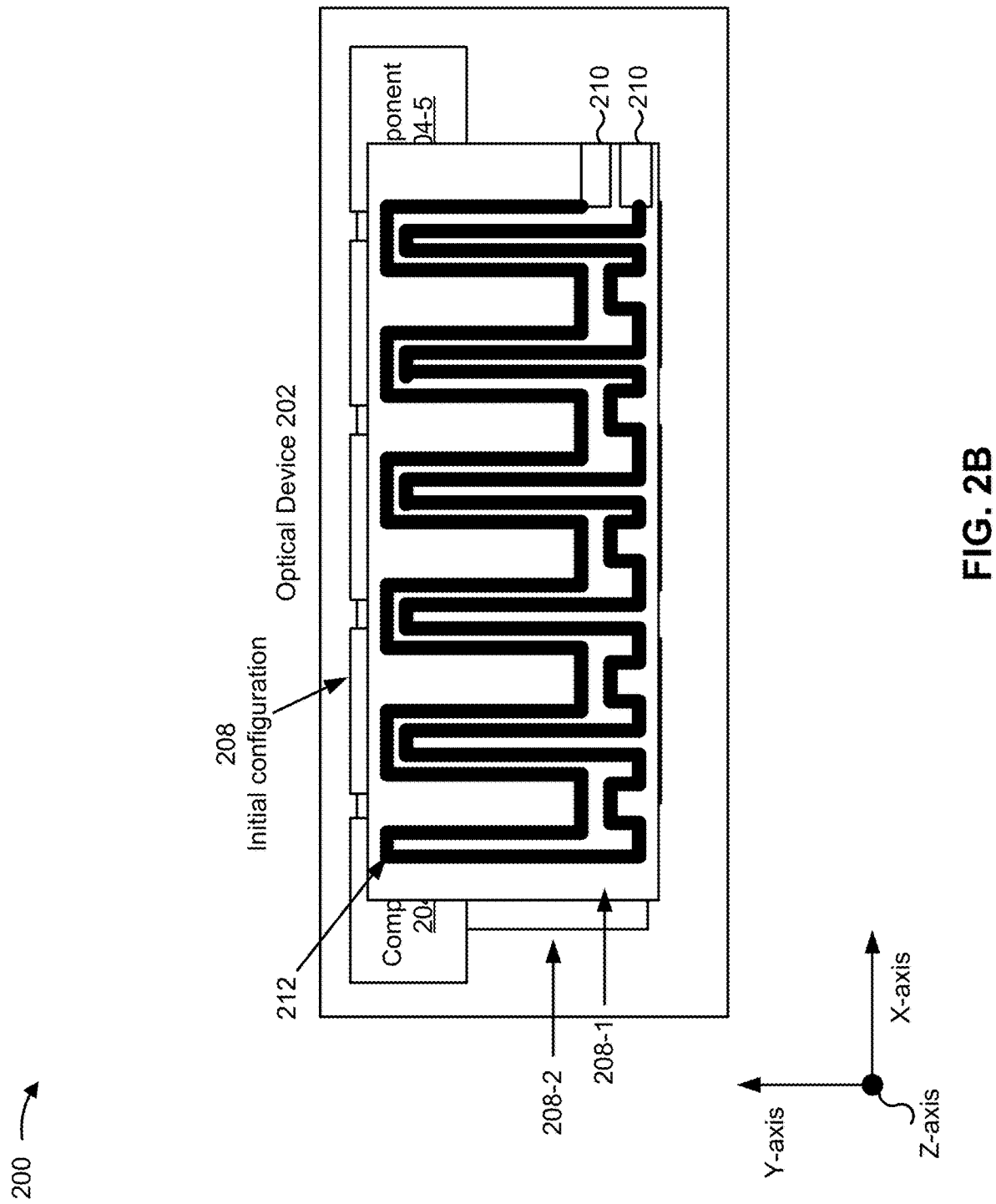

With regard to FIG. 2B, and as shown by initial configuration 208, the initial heater configuration is selected for optical device 202. For example, a set of monolithic integrated heaters 208-1 and 208-2 may be selected as the initial heater configuration. The monolithic integrated heaters may include a set of pads 210 to receive an electrical connection and a set of leads 212 (e.g., electrical traces, heating elements, or the like) to generate heat based on electricity being received via the electrical connection.

Figure 2C:
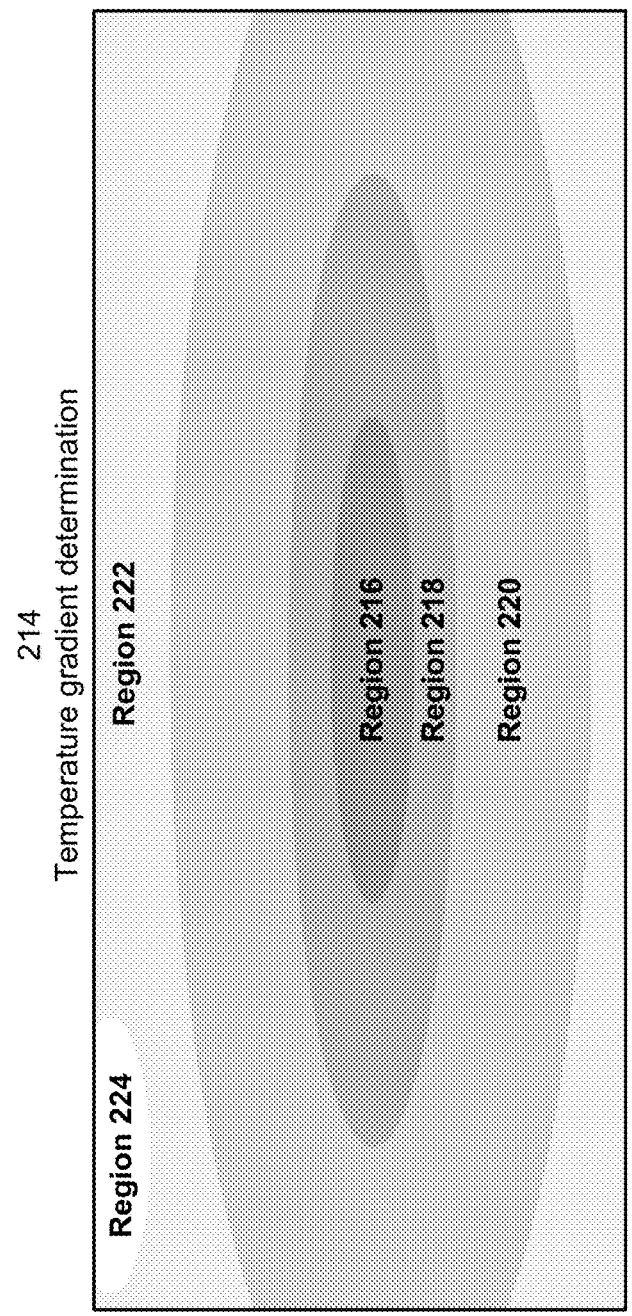

With regard to FIG. 2C, and as shown by reference number 214, the initial heater configuration may result in a particular temperature gradient for optical device 202. Regions 216-224 represent different temperatures determined for optical device 202 based on the initial heater configuration. For example, region 216 may represent a first temperature; region 218 may represent a second temperature that is less than the first temperature; region 220 may represent a third temperature that is less than the second temperature; region 222 may represent a fourth temperature that is less than the third temperature, and region 224 may represent a fifth temperature that is less than the fourth temperature. In this case, a temperature gradient between region 216 and region 224 may exceed a threshold temperature gradient for components 204 determined based on the set of design criteria.

In this way, client device 510 may identify the initial heater configuration.

As further shown in FIG. 1A, process 100 may include determining a set of optimization parameters for determining a target heater configuration based on the set of design criteria (block 140). For example, client device 510 may determine the set of optimization parameters for determining the target heater configuration. In some implementations, client device 510 may receive input identifying the set of optimization parameters. For example, during design of the integrated heater, a designer may identify the set of optimization parameters, and may provide input to client device 510 to identify set of optimization parameters.

In some implementations, the set of optimization parameters may include a set of external parameters. For example, the set of optimization parameters may include a parameter relating to an ambient temperature (e.g., between approximately 0° C. and approximately 60° C., between approximately −5° C. and approximately 60° C., or the like) for a location at which the optical package is to be located. Additionally, or alternatively, the set of optimization parameters may include an airflow parameter relating to airflow over the optical package. In this case, a convection coefficient may be calibrated for the airflow parameter based on a determination using a thermal computational fluid dynamics (CFD) model. For example, a convection film coefficient for an airflow condition may be determined based on an airflow parameter. Additionally, or alternatively, the airflow parameter may be determined using a finite element analysis (FEA) conductive model. For example, a convection boundary condition may be determined for exterior surfaces of the optical package exposed to an airflow condition determined based on the airflow parameter.

In this way, client device 510 may determine the set of optimization parameters.

As further shown in FIG. 1A, process 100 may include performing, based on the set of optimization parameters, an optimization procedure to alter the initial heater configuration to determine the target heater configuration (block 150). For example, client device 510 may perform the optimization procedure to determine the target heater configuration, which may include determining a CFD model for the optical device, calculating convection coefficients for the optical device, determining a convection boundary condition for the optical device, determining a model of airflow inside an optics block of the optical device, executing an FEA model to optimize geometric variables, and cross-correlating results of executing the FEA model with the thermal CFD model to determine whether the set of design criteria is satisfied, or the like, as described herein with regard to blocks 151-156 in FIG. 1B.

In this way, client device 510 may perform the optimization procedure.

As further shown in FIG. 1A, process 100 may include provide information identifying the target heater configuration based on performing the optimization procedure (block 160). For example, client device 510 may provide information identifying the target heater configuration to enable manufacture of an integrated heater based on the target heater configuration. In some implementations, client device 510 may provide the information identifying the target heater configuration for display via a user interface. In some implementations, client device 510 may provide information relating to the target heater configuration. For example, client device 510 may provide a materials list, a parts list, an assembly plan, an engineering specification (e.g., a dimensioning diagram, architectural diagram, etc.), or the like. In some implementations, client device 510 may provide one or more metrics regarding the target heater configuration. For example, client device 510 may provide information identifying a temperature gradient for the target heater configuration, a power consumption for the target heater configuration, an estimated savings in power consumption of the target heater configuration relative to the initial heater configuration, or the like.

In this way, client device 510 may provide information identifying the target heater configuration.

FIG. 1B provides further details regarding block 150 of FIG. 1A. As shown in FIG. 1B, process 100 may include determining a thermal computational fluid dynamics model for the optical device (block 151). For example, client device 510 may determine the CFD model for the optical device. In some implementations, client device 510 may determine the CFD model based on input to client device 510. For example, client device 510 may determine the CFD model based on the set of optimization parameters, the set of components of the optical device, a set of characteristics of the optical device (e.g., a set of materials that are to be used for the optical device, a shape of the optical device, a shape of components of the optical device, etc.), the set of design criteria, or the like. In some implementations, client device 510 may adapt another CFD model to use for the optical device. For example, client device 510 may obtain a stored CFD model or a stored CFD model template, and may adapt or input values (e.g., shape values, material values, etc.) relating to the optical device into the stored CFD model or stored CFD model template to determine the CFD model for the optical device.

In this way, client device 510 may determine the CFD model.

As further shown in FIG. 1B, process 100 may include calculating a set of convection coefficients for external surfaces of a package for the optical device (block 152). For example, client device 510 may calculate the set of convection coefficients based on executing the CFD model for an optical package of the optical device. In some implementations, client device 510 may execute the CFD model for multiple airflow conditions to determine the set of convection coefficients for external surfaces of the optical package.

For example, based on an airflow parameter identifying a range of possible airflow conditions, client device 510 may perform multiple executions of the CFD model to determine convection coefficients for the multiple possible airflow conditions. In some implementations, client device 510 may execute the CFD model for multiple external surfaces and/or portions thereof of the optical package. For example, client device 510 may identify the multiple surfaces of the optical package based on information input into client device 510, and may perform multiple executions of the CFD model to calculate convection coefficients for the multiple surfaces of the optical package.

In this way, client device 510 may calculate the set of convection coefficients.

As further shown in FIG. 1B, process 100 may include determining a convection boundary condition in a finite element analysis model (block 153). For example, client device 510 may determine the convection boundary condition in the FEA model. In some implementations, client device 510 may determine the convection boundary condition based on the set of convection coefficients. For example, client device 510 may process the set of convection coefficients to identify the convection boundary condition. In this way, client device 510 calibrates a convection coefficient (e.g., a convection film coefficient) for airflow associated with the optical package.

In this way, client device 510 may determine the convection boundary condition.

As further shown in FIG. 1B, process 100 may include determining a model of conductive air inside an optics block of the optical device (block 154). For example, client device 510 may model conductive air inside the optics block of the optical device. In some implementations, client device 510 may determine a gas/air model for the optics block. For example, client device 510 may calculate the model based on the optics block being an air environment, a gaseous environment, or the like. In some implementations, client device 510 may determine an FEA conductive thermal model of the optics block to model conductive air inside the optics block. For example, client device 510 may determine the FEA conductive thermal model with a Boolean function associated with a gas domain of the optics block. In this case, the calibrated convection boundary condition may be used for modeling exterior surfaces of the optics block exposed to ambient (i.e., non-forced) airflow. In some implementations, the model of conductive air may exclude convection inside the optics block. For example, client device 510 may determine an FEA conductive thermal model without including an effect of convective airflow. In this way, client device 510 may reduce a computational complexity of the optimization procedure relative to including convective airflow calculations without introducing a threshold error into results of the optimization procedure. In this way, a utilization of processing resources may be reduced relative to determining convective airflow to optimize the integrated heater shape.

In this way, client device 510 may determine the model of conductive air inside the optics block.

As further shown in FIG. 1B, process 100 may include executing the finite element analysis model to optimize an unknown subset of a set of geometric variables (block 155). For example, client device 510 may execute the FEA model (e.g., an FEA conductive thermal model) with a known set of geometric variables (e.g., ambient temperature range, ambient airflow condition, etc.) to optimize the unknown subset of the set of geometric variables (e.g., heater power consumption and heater shape). In some implementations, client device 510 may select the set of geometric variables. For example, client device 510 may select the set of geometric variables based on a manufacturability criterion, a calculated heat-loss path criterion, or the like. In some implementations, client device 510 may determine the target heater configuration, such as a heater power consumption and a heater geometric shape for the integrated heater based on executing the FEA model. For example, client device 510 may utilize known coefficients (e.g., the set of convection coefficients, the initial heater configuration, etc.) to determine the target heater configuration.

In some implementations, client device 510 may utilize a particular type of optimization procedure to execute the FEA model. For example, client device 510 may utilize a trial-and-error optimization procedure. Additionally, or alternatively, another type of optimization procedure may be performed, such as an iterative procedure, a convergence procedure, a heuristic procedure (e.g., a genetic algorithm), and/or the like. In some implementations, client device 510 may optimize the FEA model based on a uniform watt-density heating element selected for the integrated heater. In this case, a cost of manufacture may be reduced relative to a variable watt-density heating element selected for the integrated heater. In some implementations, client device 510 may optimize the FEA model based on a variable watt-density for the integrated heater. In this case, a reduced temperature gradient may be achieved. Based on utilizing less than a threshold quantity of geometric parameters (e.g., constraining a quantity of optimizable geometric variables to a subset of optimizable geometric variables), client device 510 may optimize the FEA model to determine a geometry for using variable watt-density heating elements for the integrated heater without an excessive (i.e., greater than a threshold) utilization of computing resources. In some implementations, client device 510 may select a type of integrated heater (e.g., uniform watt-density or variable watt-density) based on one or more design criteria, such as a size constraint, a cost constraint, a manufacturability constraint, or the like.

In this way, client device 510 may execute the FEA model.

As further shown in FIG. 1B, process 100 may include cross-correlating results of executing the finite element analysis model with the thermal computational fluid dynamics model to determine whether the set of design criteria is satisfied (block 156). For example, client device 510 may cross-correlate results of executing the FEA model with the thermal CFD model to determine whether the set of design criteria is satisfied. In this case, client device 510 may utilize results of the FEA model optimization to determine whether a heater configuration satisfies a temperature gradient criterion for components of the optical device. Similarly, client device 510 may utilize results of the FEA model optimization to determine whether a heater configuration satisfies a heater power consumption criterion. Based on the set of design criteria being satisfied, client device 510 may determine that the output of the FEA model is the target heater configuration.

Figure 2D:
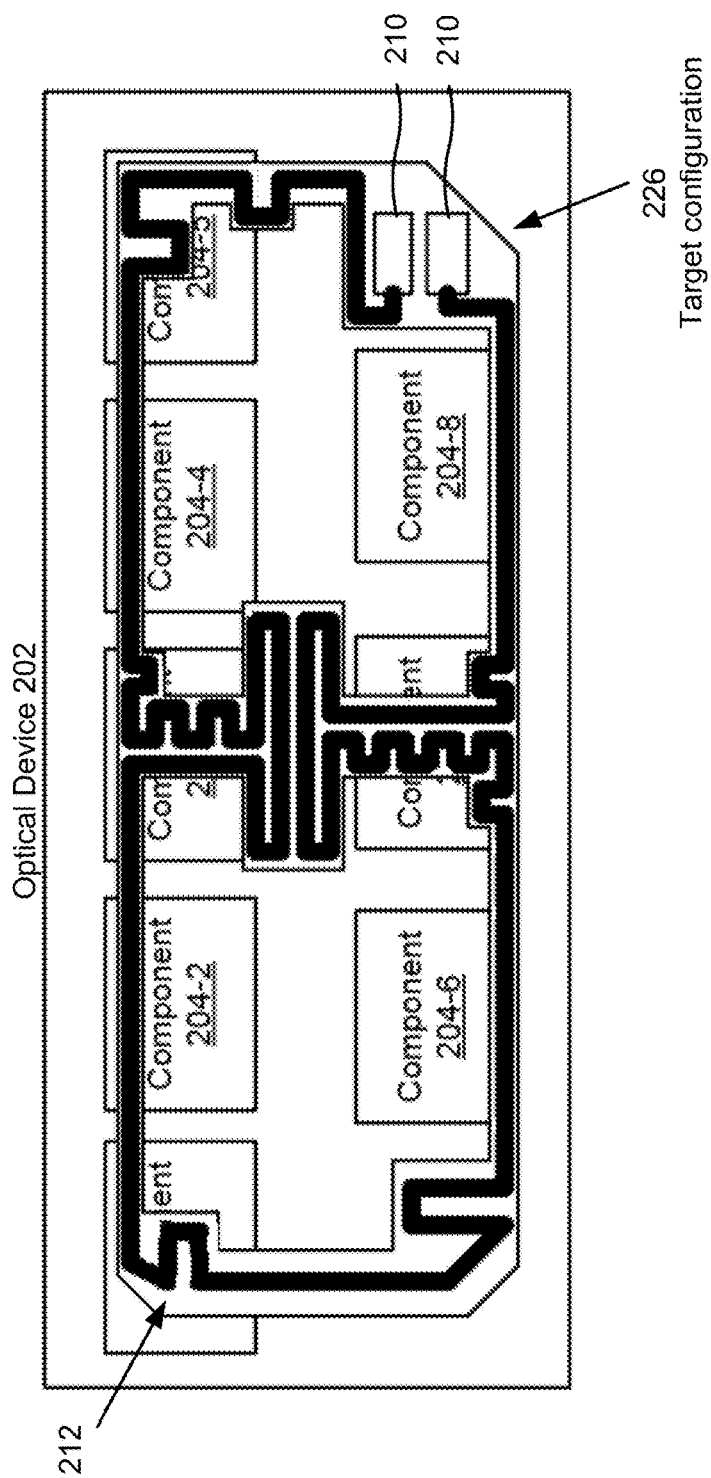

With regard to FIG. 2D, and as shown by reference number 226, the target heater configuration may be selected for optical device 202. For example, a non-monolithic shape for a single integrated heater may be selected as the target heater configuration to cause the single integrated heater to heat optical components 204 with a temperature gradient less than a threshold. The non-monolithic single integrated heater may include a set of pads 210 to receive an electrical connection and a set of leads 212 to generate heat based on electricity being received via the electrical connection.

Figure 2E:
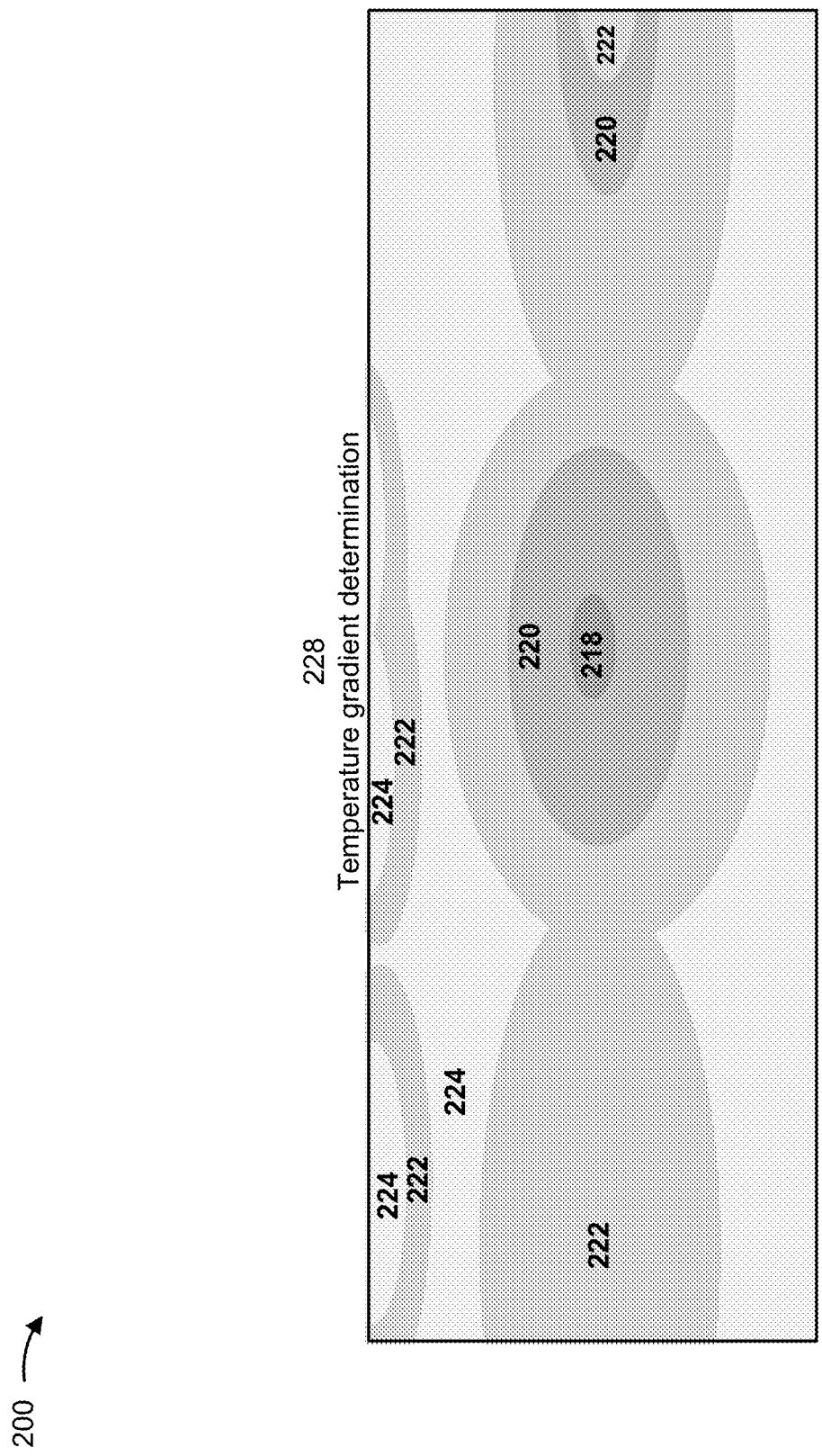

With regard to FIG. 2E, and as shown by reference number 228, the target heater configuration may result in another temperature gradient for optical device 202. Regions 218-224 represent different temperatures determined for optical device 202 based on the initial heater configuration. For example, region 218 may represent a second temperature that is less than the first temperature; region 220 may represent a third temperature that is less than the second temperature; region 222 may represent a fourth temperature that is less than the third temperature; and region 224 may represent a fifth temperature that is less than the fourth temperature. In this case, a temperature gradient between regions 218-224 may satisfy a threshold temperature gradient for components 204.

In this way, client device 510 may cross-correlate the results of executing the FEA model with the CFD model to determine whether the set of design criteria is satisfied.

Although FIGS. 1A and 1B show example blocks of process 100, in some implementations, process 100 may include additional blocks, fewer blocks, different blocks, or differently arranged blocks than those depicted in FIGS. 1A and 1B. Additionally, or alternatively, two or more of the blocks of process 100 may be performed in parallel.

As indicated above, FIGS. 2A-2E are provided merely as an example. Other examples are possible and may differ from what was described with regard to FIGS. 2A-2E.

Figure 3A:
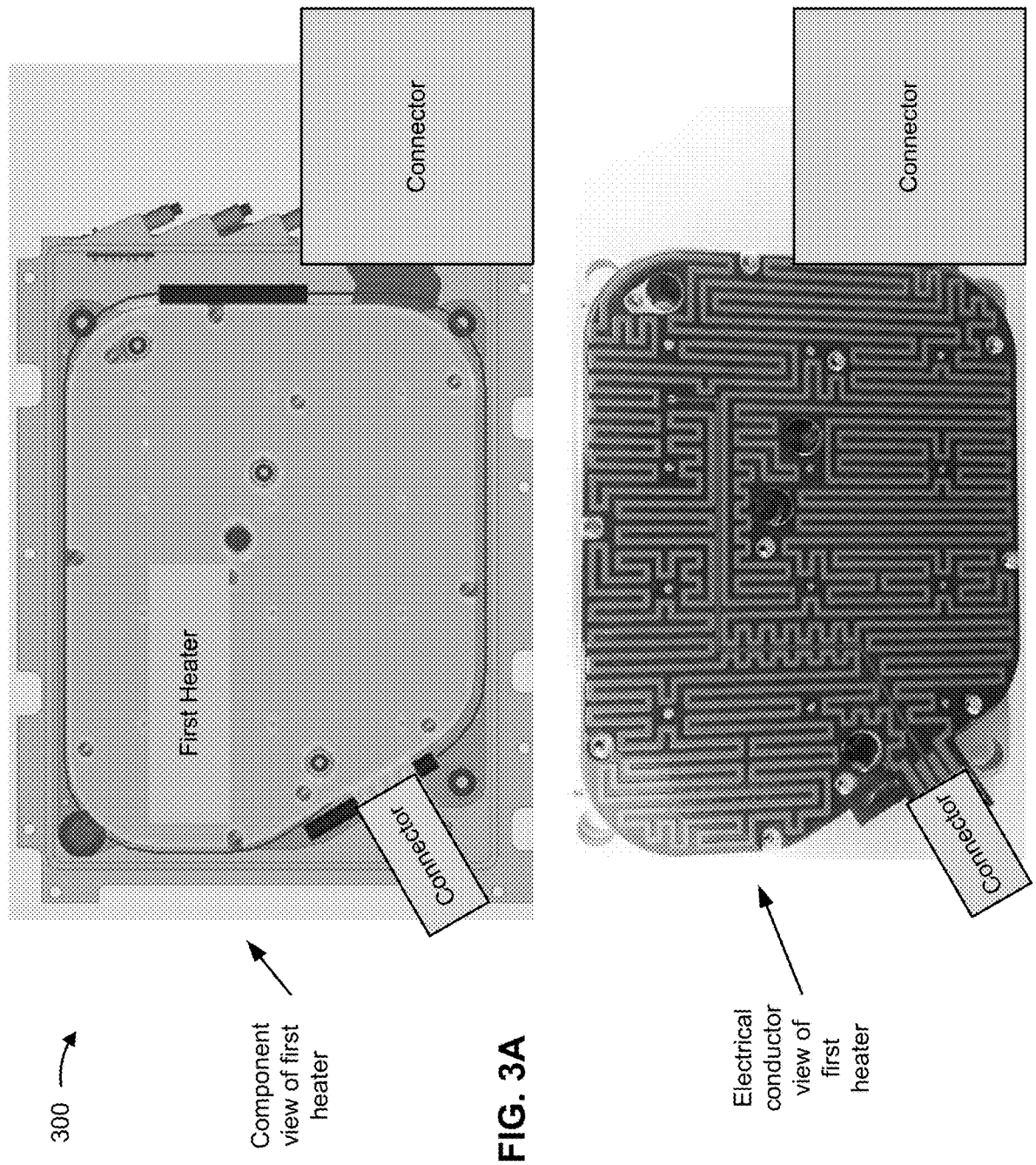
FIGS. 3A and 3B are diagrams of an example implementation relating to the example process shown in FIGS. 1A and 1B.
Figure 3B:
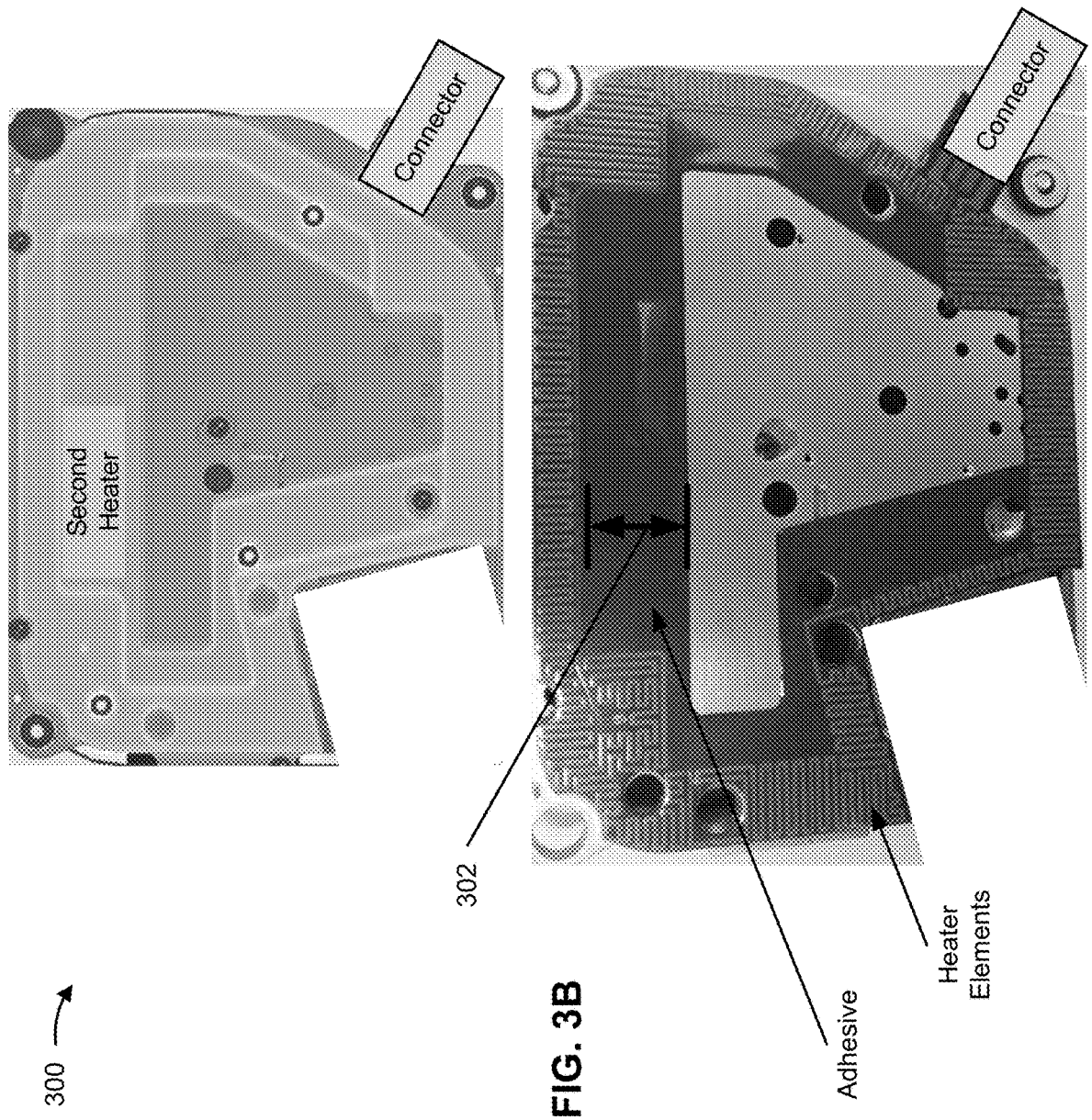

FIGS. 3A and 3B are diagrams of an example implementation 300 relating to example process 100 shown in FIGS. 1A and 1B. FIGS. 3A and 3B show an example of an optimized heater shape of an integrated heater for an optical bench.

With regard to FIGS. 3A and 3B, a twin 1×20 WSS may be configured on an Invar-based optical bench with a Kovar based optical package. Invar and Kovar may be associated with a relatively low thermal conductivities of 17.3 Watts/meter-Kelvin (W/mK) and 10.2 W/mK, respectively. Based on identifying the set of components of the WSS and determining a set of design criteria based on the set of components, it may be determined to use an initial heater configuration of two heaters for the WSS (e.g., a first heater disposed above the optical bench and a second heater disposed below the optical bench). In some implementations, the WSS may be disposed inside an optical package (e.g., a ceramic optical package, an aluminum nitride optical package, an Invar optical package, a Kovar optical package, etc.). A set of optimization parameters are determined and optimization is performed using, for example, an FEA model to model heat transfer modes (e.g., conductive heat transfer, convective heat transfer, radiative heat transfer, etc.). Based on the optimization, a target heater configuration is determined to provide an isothermal environment for the WSS. Based on the target heater configuration including two heaters directly attached to the optical bench of the WSS, rather than the WSS being provided in a thermal environment (e.g., an oven), a size of the WSS and a power consumption of the WSS is reduced.

As shown in FIG. 3A, in a top-down view, a monolithic first heater disposed above the optical bench is provided. The first heater is configured to completely cover the optical bench, and is configured to provide a uniform watt-density. For example, heat flux at different portions of the heater may be within a threshold percentage, such as within 10%, within 5%, within 1%, or the like.

As shown in FIG. 3B, in a bottom-up view, a non-monolithic second heater disposed below the optical bench is provided. The second heater is configured to cover only a portion of the optical bench and is configured to provide uniform watt-density. In this case, heat dissipation is relatively uniformly distributed by the surface area of the heater. As shown by reference number 302, portions of an adhesive used to attach the heater to the optical bench may extend beyond a limit of heater elements of the second heater. In this way, mounting of the second heater to the optical bench may be improved relative to another technique where adhesive is only disposed directly between the heater elements and the optical bench. In some implementations, the adhesive may be a pressure sensitive adhesive, such as Kapton tape or any type of pressure sensitive adhesive (PSA) tape.

In some implementations, an overall thickness of the heater (including the tape) may be approximately 400 micrometers ($\mu$m). In some implementations, a surface area may relate to a size of the optical bench and/or a footprint of optical components mounted on the optical bench that are to be maintained in an isothermal environment. For example, a heater surface area of heater elements of the heater is approximately 4750 square millimeters (mm^2).

In some implementations, at least one of the first heater and the second heater may be integrated onto a surface of the optical bench. For example, the heater elements may be disposed directly onto the surface of the optical bench and/or one or more components thereof (e.g., the heater elements may be disposed directly onto or in a glass substrate, a silicon substrate, and/or the like), such as via a printing a procedure, a deposition procedure, a liftoff procedure, and/or the like, in a shape of the first heater and/or the second heater. In this way, a size of an optical package that includes the optical bench, the first heater, and the second heater may be reduced relative to the first heater and the second heater having substrates that are attached to the optical bench using an adhesive. Moreover, an increased airgap resulting from omitting the adhesive and/or the substrates of the first heater and the second heater may result in reduced power consumption. Furthermore, omitting the adhesive may improve durability of the optical package relative to using an adhesive.

As indicated above, FIGS. 3A and 3B are provided merely as an example. Other examples are possible and may differ from what was described with regard to FIGS. 3A and 3B.

Figure 4A:
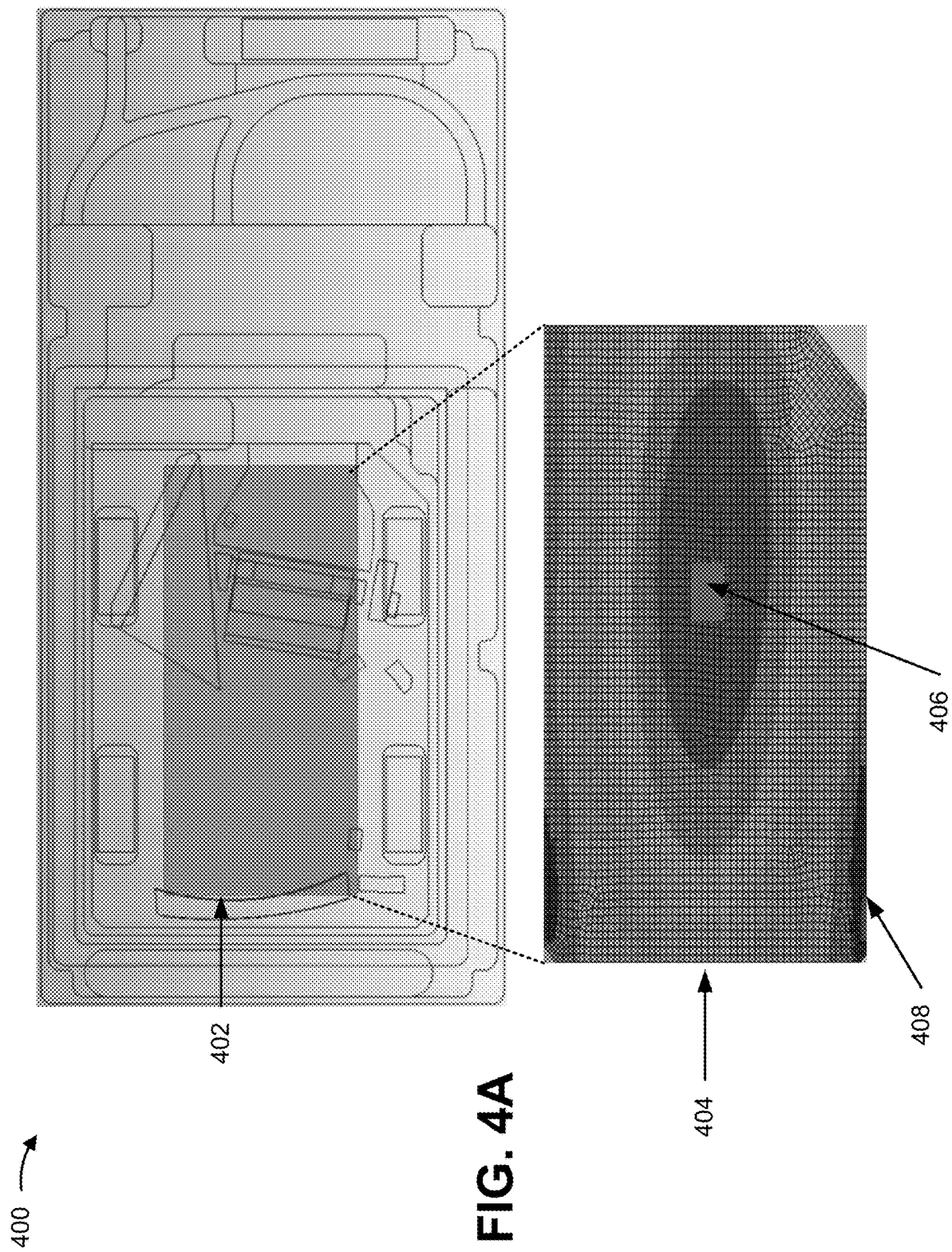
FIGS. 4A and 4B are diagrams of an example implementation relating to the example process shown in FIGS. 1A and 1B.
Figure 4B:
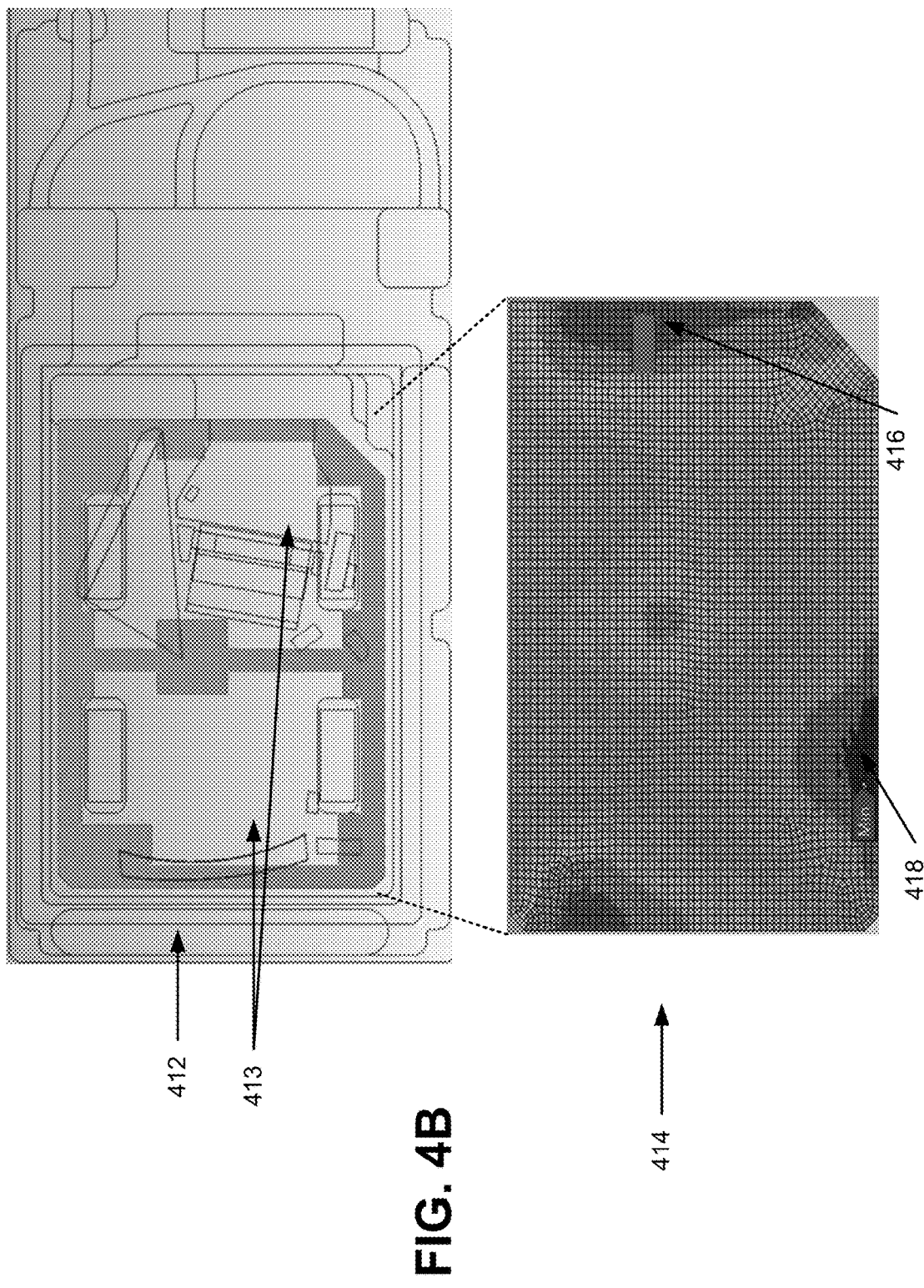

FIGS. 4A and 4B are diagrams of an example implementation 400 relating to example process 100 shown in FIGS. 1A and 1B. FIGS. 4A and 4B show an example of optimizing a heater shape of an integrated heater for an optical bench.

With regard to FIGS. 4A and 4B, a WSS is provided with a ceramic enclosure for an optical bench. The optical bench is associated with a thermal conductivity of 180 W/mK. An optical package of the WSS is manufactured using aluminum; however, attaching a heater to the aluminum package results in excessive power consumption. As a result, a heater may be configured for integration into the optical package via attachment to the optical bench.

As shown in FIG. 4A, an initial heater configuration 402 is determined for the WSS. The initial heater configuration 402 is a single monolithic integrated heater. The integrated heater may be associated with 7.6 mm rails (i.e., conductive heating elements or leads). The WSS may be associated with a 200 milli-Watt (mW) liquid crystal on substrate (LCoS) technology for optical components and a 0.8 W/mK glass substrate. As shown by reference number 404, a temperature gradient is determined for the initial heater configuration. The temperature gradient between a first temperature 406 (e.g., a relatively high temperature, such as 65.6 degrees C.

(° C.)) and a second temperature 408 (e.g., a relatively low temperature, such as 61.5° C.) exceeds a threshold temperature gradient.

As shown in FIG. 4B, a target heater configuration 412 is determined for the WSS based on performing an FEA-based optimization procedure, as described herein. The target heater configuration 412 is a single non-monolithic integrated heater. A shape of the single non-monolithic integrated heater may be configured to cause less than a threshold temperature gradient for the WSS. For example, the shape may include a set of openings 413 forming a figure-eight shape to cause a reduced heat flux in proximity to a subset of components of the WSS (e.g., a grism of the WSS). The integrated heater may be associated with 7.6 mm rails and may be mounted to a bottom of the optical bench. As shown by reference number 414, a temperature gradient is determined for the target heater configuration. The temperature gradient between a first temperature 416 (e.g., a relatively high temperature, such as 65.6 degrees C. (° C.)) and a second temperature 418 (e.g., a relatively low temperature, such as 63.3° C.) satisfies a threshold temperature gradient, thereby ensuring the WSS can operate without reduced performance resulting from a non-isothermal environment. In some implementations, the threshold temperature gradient may be less than 3° C., less than 2.5° C., less than 2° C., less than 1° C., or the like.

In some implementations, the integrated heater may be associated with a particular thickness. For example, the integrated heater may be associated with a thickness of between 200 micrometers (μm) and 600 μm, between 300 μm and 500 μm, or between 350 μm and 450 μm. In some implementations, the integrated heater may be associated with a thickness of approximately 400 μm, less than 400 μm, or the like. In some implementations, the integrated heater may be attached to the optical bench without using an adhesive (e.g., a pressure sensitive adhesive). For example, the heater elements may be integrated into the optical bench (e.g., electrically conductive heater elements may be printed, deposited, patterned, or the like onto a substrate of the optical bench directly, rather than onto a separate substrate that is attached to the optical bench).

In this way, an airgap between the heater elements and the optical package may be increased, thereby reducing power consumption relative to a reduced airgap associated with an integrated heater with a substrate attached to the optical bench. Moreover, based on obviating a need for adhesive, a durability of the WSS may be increased based on a reduced likelihood of degradation to an adhesive causing the heater elements to become detached from the optical bench. Furthermore, obviating a need for a substrate to carry the heater elements may reduce an insulation between the heater elements and the optical bench caused by the substrate, thereby reducing a power consumption associated with the heater elements. Furthermore, based on attaching the heater elements directly to the optical bench, such as via printing the heater elements to the optical bench, a difficulty of manufacture is reduced relative to being required to manually align a substrate, onto which the heater elements are attached, to a position on the optical bench.

In some implementations, heater elements of the integrated heater may be integrated directly onto a surface of components of the WSS, such as via printing conductive heating elements to the surface of the components. In some implementations, heating elements (e.g., electrical traces) may be patterned onto an interior surface of the optical package (e.g., an aluminum nitride interior surface of the optical package). For example, the heating elements may be patterned without a substrate or an adhesive layer between the heating elements and an interior surface of the optical package.

In some implementations, the integrated heater may include a flexible substrate. For example, the integrated heater may include a set of heater elements disposed onto a flexible substrate that is attached to the optical bench, a component of the WSS, or the like. In this way, the integrated heater may be displaced in three dimensions from a plane of the optical bench, thereby enabling improved control of temperature gradients and/or reduced power consumption relative to planar integrated heaters.

As indicated above, FIGS. 4A and 4B are provided merely as an example. Other examples are possible and may differ from what was described with regard to FIGS. 4A and 4B.

FIG. 5 is a diagram of an example environment 500 in which systems and/or methods, described herein, may be implemented. As shown in FIG. 5, environment 500 may include client device 510, server device 520, and network 530. Devices of environment 500 may interconnect via wired connections, wireless connections, or a combination of wired and wireless connections.

Client device 510 includes one or more devices capable of receiving, generating, storing, processing, and/or providing information associated with determining an optimized shape for an integrated heater. For example, client device 510 may include a communication and/or computing device, such as a mobile phone (e.g., a smart phone, a radiotelephone, etc.), a computer (e.g., a laptop computer, a tablet computer, a handheld computer, a desktop computer, etc.), a gaming device, a wearable communication device (e.g., a smart wristwatch, a pair of smart eyeglasses, etc.), or a similar type of device.

Server device 520 includes one or more devices capable of storing, processing, and/or routing information associated with determining an optimized shape for an integrated heater. In some implementations, server device 520 may include a communication interface that allows server device 520 to receive information from and/or transmit information to other devices in environment 500.

Network 530 includes one or more wired and/or wireless networks. For example, network 530 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
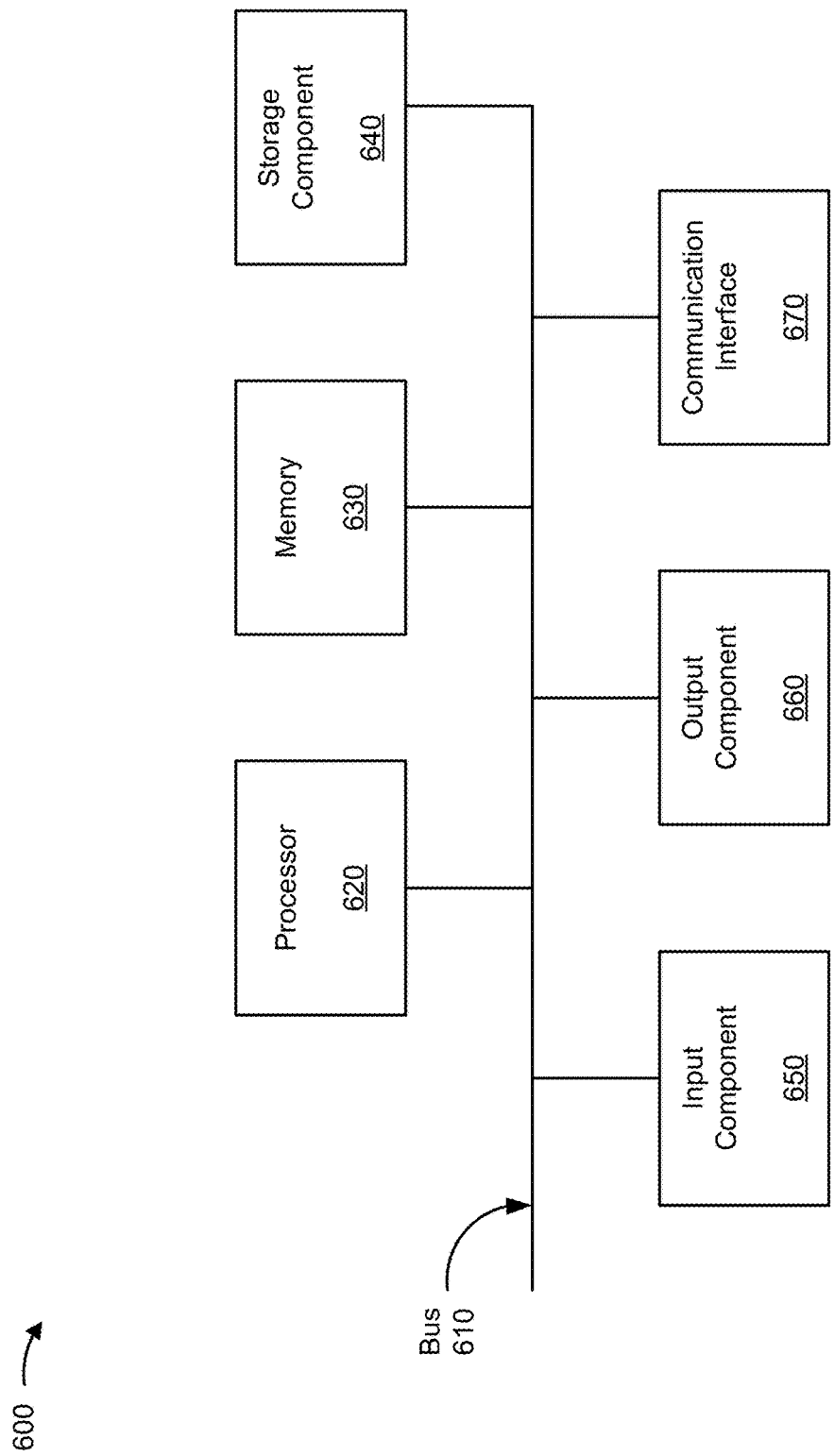
FIG. 6 is a diagram of example components of one or more devices of FIG. 5.

FIG. 6 is a diagram of example components of a device 600. Device 600 may correspond to client device 510 and/or server device 520. In some implementations, client device 510 and/or server device 520 may include one or more devices 600 and/or one or more components of device 600. As shown in FIG. 6, device 600 may include a bus 610, a processor 620, a memory 630, a storage component 640, an input component 650, an output component 660, and a communication interface 670.

Bus 610 includes a component that permits communication among the components of device 600. Processor 620 is implemented in hardware, firmware, or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a sensor for sensing information (e.g., a global positioning system (GPS) component, an accelerometer, a gyroscope, and/or an actuator). Output component 660 includes a component that provides output information from device 600 (e.g., a display, a speaker, and/or one or more light-emitting diodes (LEDs)).

Communication interface 670 includes a transceiver-like component (e.g., a transceiver and/or a separate receiver and transmitter) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, or the like.

Device 600 may perform one or more processes described herein. Device 600 may perform these processes based on processor 620 executing software instructions stored by a non-transitory computer-readable medium, such as memory 630 and/or storage component 640. A computer-readable medium is defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

In this way, a heater shape for an integrated heater can be determined to ensure an isothermal environment for an optical device. Moreover, an optimized heater shape for a WSS is provided to enable improved performance for the WSS relative to other heater configurations associated with greater temperature gradients, increased power consumption, or the like.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
identifying, by a device, a set of components of an optical device;
determining, by the device, a set of design criteria based on the set of components of the optical device;
identifying, by the device, an initial heater configuration based on the set of design criteria;
determining, by the device, a set of optimization parameters for determining a target heater configuration based on the set of design criteria;
performing, by the device and based on the set of optimization parameters, an optimization procedure to alter the initial heater configuration to determine the target heater configuration,
performing the optimization procedure comprising:
determining a thermal computational fluid dynamics model for the optical device,
calculating a set of coefficients for external surfaces of a package for the optical device,
determining a boundary condition in a finite element analysis model,
determining a model of conductive air inside an optics block of the optical device,
executing the finite element analysis model to optimize an unknown subset of a set of geometric variables, and
cross-correlating results of executing the finite element analysis model with the thermal computational fluid dynamics model to determine whether the set of design criteria is satisfied; and
providing, by the device, information identifying the target heater configuration based on performing the optimization procedure.

2. The method of claim 1, further comprising:
selecting a uniform watt-density heater element for the target heater configuration; and
wherein executing the finite element analysis model comprises:
executing the finite element analysis model to optimize a geometry of the target heater configuration.

3. The method of claim 1, further comprising:
selecting a variable watt-density heater element for the target heater configuration; and
wherein executing the finite element analysis model comprises:
constraining a geometry of the target heater configuration to a subset of optimizable geometric variables; and
executing the finite element analysis model to optimize the subset of optimizable geometric variables.

4. The method of claim 1, wherein the cross-correlating comprises:
determining that a heater power consumption satisfies a heater power consumption criterion of the set of design criteria; and
determining that the set of design criteria is satisfied based on determining that the heater power consumption satisfies the heater power consumption criterion.

5. The method of claim 1, wherein the cross-correlating comprises:
determining that a temperature gradient satisfies a temperature gradient criterion of the set of design criteria; and
determining that the set of design criteria is satisfied based on determining that the temperature gradient satisfies the temperature gradient criterion.

6. The method of claim 1, wherein the optimization procedure is a trial-and-error optimization procedure.

7. A method, comprising:
identifying, by a device, a set of components of an optical device;
determining, by the device, a set of design criteria based on the set of components of the optical device;
identifying, by the device, an initial heater configuration based on the set of design criteria;
determining, by the device, a set of optimization parameters for determining a target heater configuration based on the set of design criteria;
performing, by the device and based on the set of optimization parameters, an optimization procedure to alter the initial heater configuration to determine the target heater configuration; and
providing, by the device, information identifying the target heater configuration based on performing the optimization procedure.

8. The method of claim 7, wherein performing the optimization procedure comprises determining a computation fluid dynamics model for the optical device.

9. The method of claim 7, wherein performing the optimization procedure comprises calculating a set of convection coefficients for external surfaces of a package for the optical device.

10. The method of claim 7, wherein performing the optimization procedure comprises determining a convection boundary condition in a finite element analysis model.

11. The method of claim 7, wherein performing the optimization procedure comprises determining a model of conductive air inside an optics block of the optical device.

12. The method of claim 7, wherein performing the optimization procedure comprises cross-correlating results of executing a finite element analysis model with a thermal computational fluid dynamics model to determine whether the set of design criteria is satisfied.

13. A method, comprising:
identifying, by a device, a set of components of an optical device;
determining, by the device, a set of design criteria based on the set of components of the optical device;
identifying, by the device, an initial heater configuration based on the set of design criteria;
determining, by the device, a set of optimization parameters for determining a target heater configuration based on the set of design criteria;
performing, by the device and based on the set of optimization parameters, an optimization procedure to alter the initial heater configuration to determine the target heater configuration,
the target heater configuration comprising:
a plurality of heating elements disposed onto an interior surface of an optical package without an adhesive layer being disposed between the plurality of heating elements and the interior surface of the optical package,
the optical package to enclose the optical device,
the plurality of heating elements being arranged in a shape to provide an isothermal environment inside the optical package,
wherein the isothermal environment comprises a temperature gradient of less than 3 degrees Celsius; and providing, by the device, information identifying the target heater configuration based on performing the optimization procedure.

14. The method of claim 13, wherein the interior surface is an aluminum nitride interior surface; and
   wherein the plurality of heating elements is a plurality of electrical traces integrated onto the aluminum nitride interior surface.

15. The method of claim 13, wherein the temperature gradient is less than 2.5 degrees Celsius.

16. The method of claim 13, wherein the temperature gradient is less than 2 degrees Celsius.

17. The method of claim 13, wherein the target heater configuration is to maintain the isothermal environment for an ambient temperature range of between 0 degrees Celsius and 60 degrees Celsius.

18. The method of claim 13, wherein a thickness of one of the heating elements is less than 500 micrometers.

19. The method of claim 13, wherein at least a portion of at least one heating element, of the plurality of heating elements, is disposed onto a surface of an optical component inside the optical package.

20. The method of claim 13, wherein the optical device is a wavelength selective switch (WSS).

\* \* \* \* \*